United States Patent

Kato et al.

[11] Patent Number: 5,868,473
[45] Date of Patent: Feb. 9, 1999

[54] HYDRULIC BRAKING PRESSURE CONTROL SYSTEM FOR AN AUTOMOTIVE VEHICLE

[75] Inventors: Toshihisa Kato, Anjo; Yasuhiro Abe, Toyota; Noritaka Yamada, Susono, all of Japan

[73] Assignees: Aisin Seiki Kabushiki Kaisha, Kariya; Toyota Jidosha Kabushiki Kaisha, Toyota, both of Japan

[21] Appl. No.: 942,900

[22] Filed: Oct. 2, 1997

Related U.S. Application Data

[62] Division of Ser. No. 633,313, Apr. 17, 1996, abandoned.

[30] Foreign Application Priority Data

Apr. 18, 1995 [JP] Japan .................................. 7-117783

[51] Int. Cl.$^6$ ....................................................... B60T 8/88
[52] U.S. Cl. ...................................... 303/122.09; 303/169
[58] Field of Search ...................... 303/122.03, 122.04, 303/122.05, 122.06, 20, 122.09, 122.1, 122.12, 169; 701/76

[56] References Cited

U.S. PATENT DOCUMENTS

| | | |
|---|---|---|
| 3,920,284 | 11/1975 | Lane et al. . |
| 4,013,324 | 3/1977 | Quon . |
| 4,059,312 | 11/1977 | Jonner . |
| 4,125,825 | 11/1978 | Takeuchi et al. . |
| 4,955,671 | 9/1990 | Higashimura ....................... 303/122.06 |
| 5,277,482 | 1/1994 | Beyer et al. ........................ 303/122.06 |
| 5,476,311 | 12/1995 | Fennel et al. ....................... 303/122.06 |

FOREIGN PATENT DOCUMENTS

| | | |
|---|---|---|
| 0 655 376 | 5/1995 | European Pat. Off. . |
| 29 33 336 | 3/1981 | Germany . |
| 36 44 139 | 7/1988 | Germany . |
| 41 22 484 | 1/1993 | Germany . |
| 6-227384 | 8/1994 | Japan . |
| 6-35842 | 9/1994 | Japan . |

*Primary Examiner*—Lee W. Young
*Attorney, Agent, or Firm*—Burns, Doane, Swecker & Mathis, LLP

[57] ABSTRACT

The invention is directed to a hydraulic braking pressure control system which includes wheel brake cylinders, a pressure generator for supplying a hydraulic braking pressure to the wheel cylinders through two hydraulic pressure circuits, and a pressure control device disposed in the two circuits, between the pressure generator and the wheel cylinders, for controlling the hydraulic pressure in each of the wheel cylinders. The system further includes wheel speed sensors for detecting wheel speeds of the road wheels, respectively, and a braking force controller which controls the braking force by actuating the pressure control device in accordance with control modes provided in response to output signals of the wheel speed sensors. A circuit malfunction detection unit is provided for detecting malfunction caused in either one of the two hydraulic circuits on the basis of output signals of the wheel speed sensors, and a control mode changeover unit is provided for changing over a control mode to another control mode, when the circuit malfunction detection unit detects the malfunction. For example, a wheel speed comparison unit compares the wheel speed in one of the two circuits with the wheel speed in the other circuit, and the circuit malfunction detection unit detects the malfunction on the basis of the compared result of the wheel speed comparison unit.

3 Claims, 8 Drawing Sheets

HYDRULIC BRAKING PRESSURE CONTROL SYSTEM FOR AN AUTOMOTIVE VEHICLE

This application is a divisional of application Ser. No. 08/633,313, filed Apr. 17, 1996.

BACKGROUND OF THE INVENTION

1. Field of the Invention

The present invention relates to a hydraulic pressure control system for an automotive vehicle, and more particularly to the system having a dual circuit brake system.

2. Description of the Related Arts

As a hydraulic braking pressure control system for an automotive vehicle, the one with an anti-skid control function for decreasing, increasing or holding a braking pressure to each wheel cylinder to obtain a maximum coefficient of friction, has come into wide use. For example, Japanese Utility model publication No.6-35842 discloses such a hydraulic braking pressure control system having (a) a hydraulic pressure supply apparatus, (b) an electromagnetic hydraulic pressure control apparatus which controls a hydraulic pressure of a hydraulic pressure source to produce a second output hydraulic pressure, and supply the second output hydraulic pressure to a second wheel brake cylinder through a second hydraulic passage, (c) a transmission changeover apparatus which is provided in the second hydraulic passage, to connect a pressure chamber which produces a first output hydraulic pressure of a hydraulic pressure supply apparatus even in the case where leakage of fluid is caused in a portion for holding a pressure from the electromagnetic hydraulic pressure control apparatus, and which transmits the second output hydraulic pressure to the second wheel brake cylinder of the electromagnetic hydraulic pressure control apparatus, but transmits the first output hydraulic pressure of the hydraulic pressure supply apparatus when the magnetic hydraulic pressure control apparatus broke down, and (d) shutting means provided in the transmission changeover apparatus for shutting off the flow of fluid from the transmission changeover apparatus to at least either one of the electromagnetic hydraulic pressure control apparatus and the second wheel brake cylinder, in the case where the fluid is caused to be leaked from the hydraulic pressure supply apparatus due to a trouble of either one of them.

In the system as disclosed in the above Japanese Utility model publication No.6-35842, a hydraulic braking pressure condition is detected by a hydraulic pressure sensor (98, 100 in FIG. 1 of the publication), so that malfunction of hydraulic circuit is determined on the basis of the detected result. However, these hydraulic pressure sensors are high in price, so that it has been desired to constitute an apparatus which never requires any hydraulic pressure sensors including sensors provided for hydraulic pressure control.

SUMMARY OF THE INVENTION

Accordingly, it is an object of the present invention to provide a hydraulic braking pressure control system for controlling a braking pressure control to each road wheel of a vehicle through two hydraulic pressure circuits, without any hydraulic pressure sensors, and detecting easily and certainly malfunction in any hydraulic pressure circuit to enable an adequate braking force control in response to a detected result.

In accomplishing the above and other objects, a hydraulic braking pressure control system for an automotive vehicle having a dual circuit brake system comprises wheel brake cylinders operatively connected to road wheels of the vehicle for applying a braking force thereto, respectively, a hydraulic pressure generator for supplying a hydraulic braking pressure to the wheel brake cylinders through two hydraulic pressure circuits, and pressure control means disposed in the two hydraulic pressure circuits, between the hydraulic pressure generator and the wheel brake cylinders, for controlling the hydraulic braking pressure in each of the wheel brake cylinders. The system further comprises wheel speed detection means for detecting wheel speeds of the road wheels, respectively, braking force control means for controlling the braking force by actuating the pressure control means in accordance with control modes provided in response to output signals of the wheel speed detection means, circuit malfunction detection means for detecting malfunction caused in either one of the two hydraulic pressure circuits on the basis of output signals of the wheel speed detection means, and control mode changeover means for changing over a control mode to another control mode provided in the braking force control means, when the circuit malfunction detection means detects the malfunction.

In the above-described system, wheel speed comparison means is preferably provided for comparing a wheel speed of a road wheel operatively connected to one of the wheel brake cylinders disposed in one of the two hydraulic pressure circuits with a wheel speed of a road wheel operatively connected to one of the wheel brake cylinders disposed in the other hydraulic pressure circuit on the basis of the output signals of the wheel speed detection means. In this case, the circuit malfunction detection means is adapted to detect the malfunction on the basis of the compared result of the wheel speed comparison means.

The above-described system may further comprise anti-skid control determination means for determining whether an anti-skid control operation in one of the two hydraulic pressure circuits lasts more than a predetermined time period on the basis of the output signals of the wheel speed detection means. In this system, the circuit malfunction detection means is adapted to detect the malfunction on the basis of the result of the anti-skid control determination means.

In the above-described system, acceleration calculation means may be provided for calculating wheel accelerations of the road wheels on the basis of the output signals of the wheel speed detection means, respectively, and acceleration determination means may be provided for determining the relationship between the wheel accelerations of front road wheels and the wheel accelerations of rear road wheels on the basis of the result of the acceleration calculation means. In this system, two hydraulic pressure circuits is divided into a first circuit provided for the front road wheels and a second circuit provided for the rear road wheels, and the circuit malfunction detection means is adapted to detect the malfunction on the basis of the result of the acceleration determination means.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
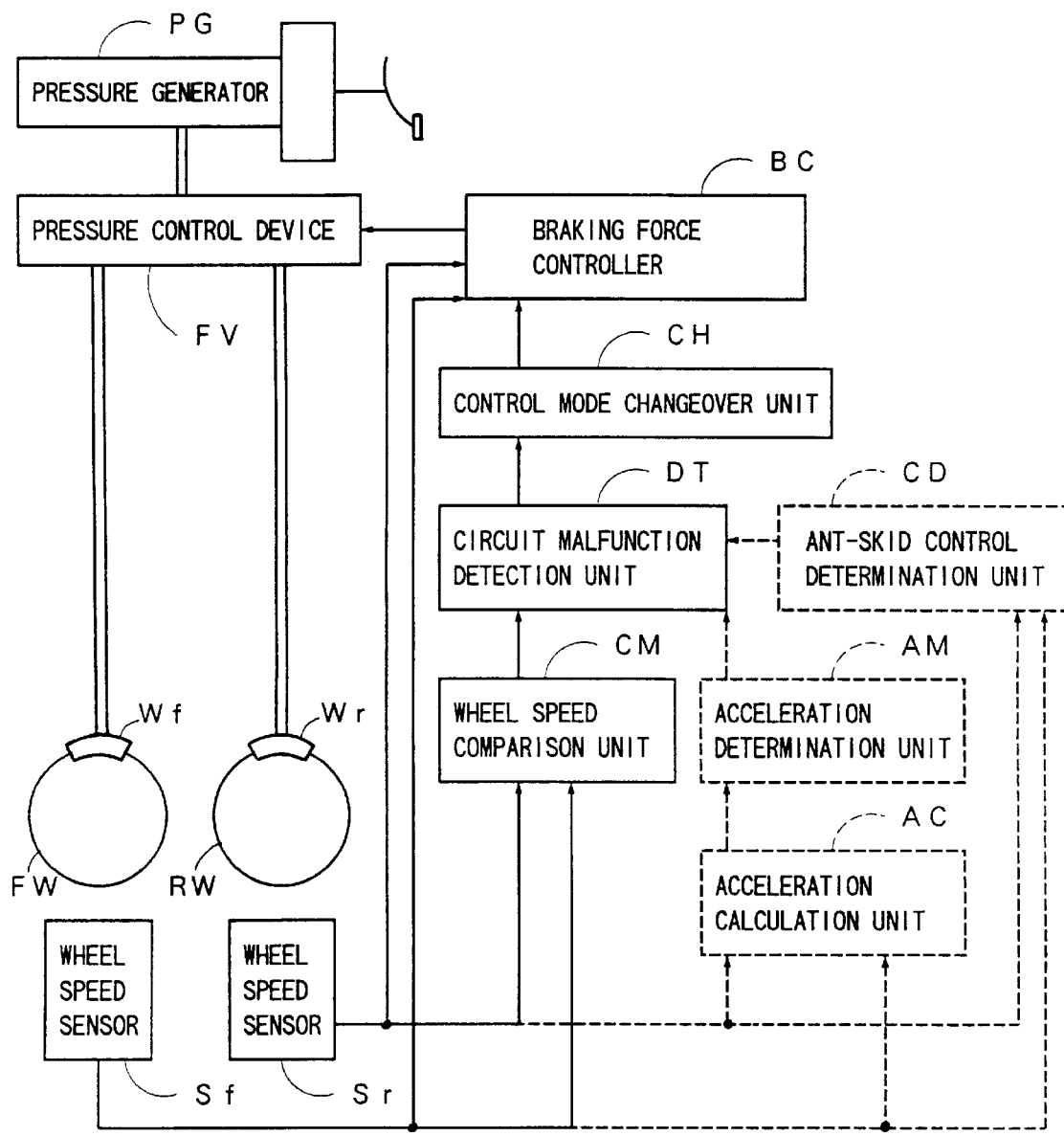
FIG. 1 is a general block diagram illustrating a hydraulic braking pressure control system according to the present invention.

Referring to FIG. 1, there is schematically illustrated a hydraulic braking pressure control system according to the present invention, which includes wheel brake cylinders Wf, Wr operatively connected to road wheels including front and rear road wheels FW, RW of the vehicle, for applying a braking force thereto, respectively, a hydraulic pressure generator PG for supplying a hydraulic braking pressure to the wheel brake cylinders Wf, Wr through two hydraulic pressure circuits, and a pressure control device FV disposed in the two hydraulic pressure circuits, between the hydraulic pressure generator PG and the wheel brake cylinders Wf, Wr, for controlling the hydraulic braking pressure in each of the wheel brake cylinders Wf, Wr. Accordingly, when the hydraulic pressure generator PG is operated, the hydraulic braking pressure is supplied from the pressure generator PG to each of wheel brake cylinders Wf, Wr through the pressure control device FV, so that a braking force is applied to each of the road wheels FW and RW. The system further includes wheel speed sensors Sf, Sr for detecting wheel speeds of the road wheels FW, RW, respectively, and a braking force controller BC which controls the braking force by actuating the pressure control device FV in accordance with control modes provided in response to output signals of the wheel speed sensors Sf, Sr. A circuit malfunction detection unit DT is provided for detecting malfunction caused in either one of the two hydraulic pressure circuits on the basis of output signals of the wheel speed sensors Sf, Sr, and a control mode changeover unit CH is provided for changing over a control mode to another control mode provided in the braking force controller BC, when the circuit malfunction detection unit DT detects the malfunction. Furthermore, a wheel speed comparison unit CM is provided for comparing a wheel speed of a road wheel operatively connected to one of the wheel brake cylinders Wf, Wr disposed in one of the two hydraulic pressure circuits with a wheel speed of a road wheel operatively connected to one of the wheel brake cylinders Wf, Wr disposed in the other hydraulic pressure circuit on the basis of the output signals of the wheel speed sensors Sf, Sr, so that the circuit malfunction detection unit DT detects the malfunction on the basis of the compared result of the wheel speed comparison unit CM.

As illustrated by phantom lines in FIG. 1, an antiskid control determination unit CD may be provided for determining whether an anti-skid control operation in one of the two hydraulic pressure circuits lasts more than a predetermined time period on the basis of the output signals of the wheel speed sensors Sf, Sr, so that the circuit malfunction detection unit DT detects the malfunction on the basis of the result of the anti-skid control determination unit CD. Or, an acceleration calculation unit AC may be provided for calculating wheel accelerations of the road wheels FW, RW on the basis of the output signals of the wheel speed sensors Sf, Sr, respectively, and an acceleration determination unit AM may be provided for determining the relationship between the wheel accelerations of front road wheel FW and the wheel accelerations of rear road wheel RW on the basis of the result of the acceleration calculation unit AC. In this case, two hydraulic pressure circuits is divided into a first circuit provided for the front road wheel FW and a second circuit provided for the rear road wheel RW. Accordingly, the circuit malfunction detection unit DT may detect the malfunction on the basis of the result of the acceleration determination unit AM.

Figure 2:
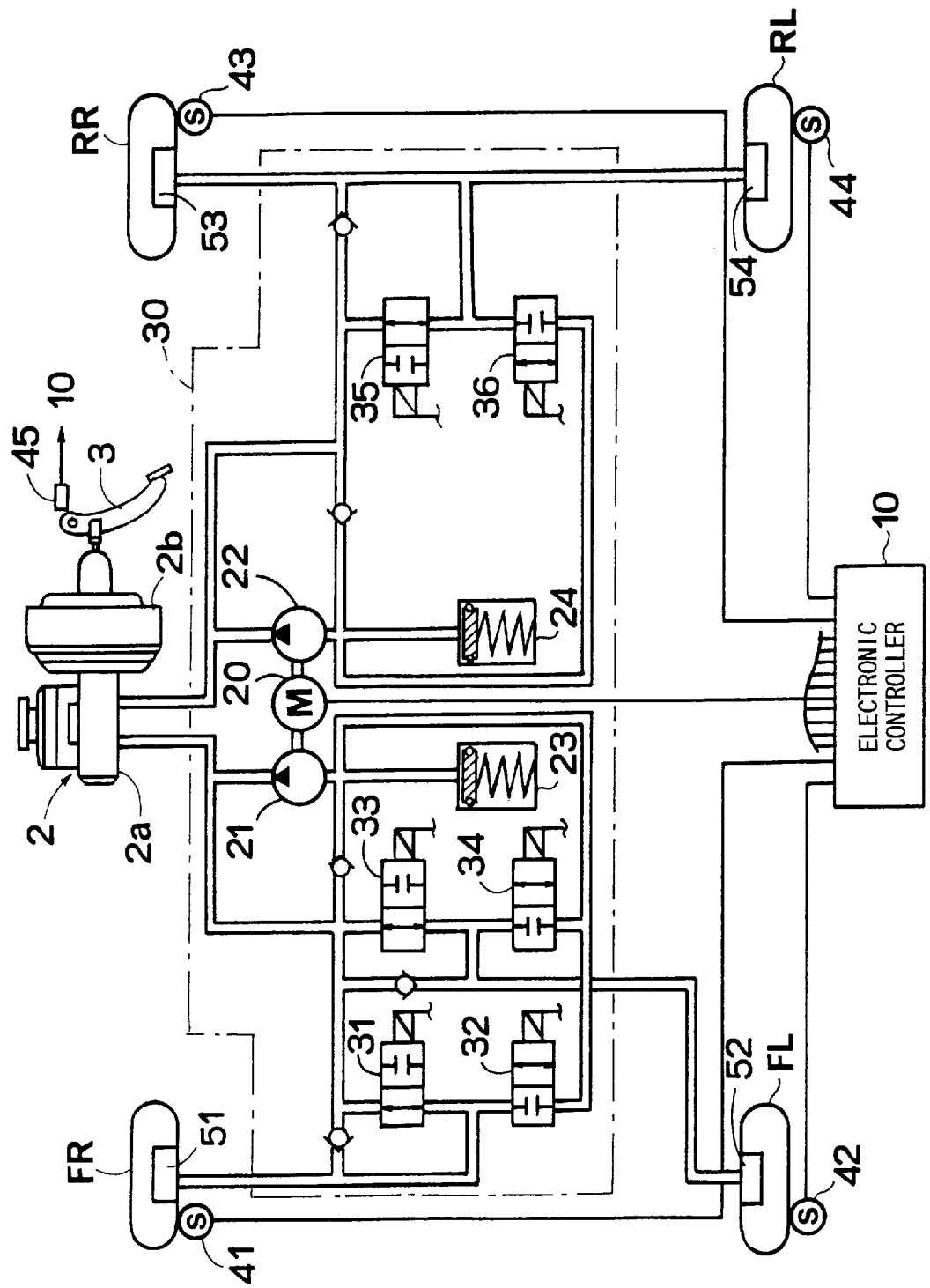
FIG. 2 is a schematic block diagram of a hydraulic braking pressure control system of an embodiment of the present invention.

More specifically, an embodiment of the present invention is illustrated in FIGS. 2 to 5. Referring to FIG. 2, hydraulic pressure circuits are provided for connecting a hydraulic pressure generator 2, which comprises a master cylinder 2a and a booster 2b operated in response to a depression of a brake pedal 3, to wheel brake cylinders 51 to 54 operatively mounted on the road wheels FR, FL, RR and RL, respectively. And, pumps 21, 22, reservoirs 23, 24 and electromagnetic valves 31–36 are disposed in the hydraulic pressure circuits. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. In the present embodiment, a front and rear dual circuit system has been formed as shown in FIG. 2.

Between the hydraulic pressure generator 2 and wheel brake cylinders 51 to 54, there is disposed an actuator 30 which corresponds to the pressure control device FV in FIG. 1. The actuator 30 includes solenoid valves 31, 32 and solenoid valves 33, 34 which are disposed respectively in the hydraulic circuits for connecting one output port of the master cylinder 2a to the wheel brake cylinders 51, 52, and the pump 21 is disposed between the master cylinder 2a and the solenoid valves. Similarly, the solenoid valves 35, 36 are disposed respectively in the hydraulic circuits for connecting the other output port of the master cylinder 2a to the wheel brake cylinders 53, 54 and the pump 22 is disposed between the master cylinder 2a and the solenoid valves 35, 36.

The pumps 21, 22 are driven by an electric motor 20, so that the brake fluid raised to a predetermined pressure is supplied to these hydraulic circuits. Accordingly, these hydraulic pressure circuits serve as the circuits through which the hydraulic braking pressure is supplied to the normally open solenoid valves 31, 33 and 35. The hydraulic pressure circuits at the drain side of the normally closed solenoid valves 32, 34 are connected to the pump 21 through the reservoir 23, and the hydraulic pressure circuits at the drain side of the solenoid valves 36 is connected to the pump 22 through the reservoir 24. Each of the reservoirs 23, 24 is provided with a piston and a spring, and functions so as to store the brake fluid returned from each of the solenoid valves 32, 34, 36 through the hydraulic circuits at the drain side thereof, and to supply the brake fluid to those solenoid valves when the pumps 21, 22 operate.

Each of the solenoid valves 31 to 36 is a two-port two-position solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from the communication with the hydraulic pressure generator 2 and the pump 21 or 22, and is communicated with the reservoir 23 or 24. Check valves shown in FIG. 2 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 36 energized or de-energized, the hydraulic braking pressure in each of the wheel brake cylinders 51 to 54 is increased, decreased or held. Namely, when the current is not fed to the solenoid coil of each of the solenoid valves 31 to 36, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. Further, when the current is fed only to the solenoid coils of the solenoid valves 31, 33 and 35, the hydraulic braking pressure in each wheel brake cylinder is held. Therefore, by adjusting the time intervals of energization and de-energization of the solenoid valves, it is possible to provide a so-called pulse-increase mode (step-increase mode) or a pulse-decrease mode so as to gradually increase or decrease the hydraulic braking pressure.

The above-described solenoid valves 31 to 36 are electrically connected to the electronic controller 10 which controls the operation of the solenoid valves 31 to 36. The electric motor 20 is also connected to the electric controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of electromagnetic induction type which comprises a pick-up having a coil wound around a permanent magnet and a rotor having an outer peripheral end thereof provided with teeth, and functions to output a voltage with a frequency proportional to the rotational speed of each road wheel, while other types of sensor may be used, instead of the above-described sensor. There is also provided a brake switch 45 which is turned on when the brake pedal 3 is depressed, and turned off when the brake pedal 3 is released, and which is electrically connected to the electronic controller 10.

Figure 3:
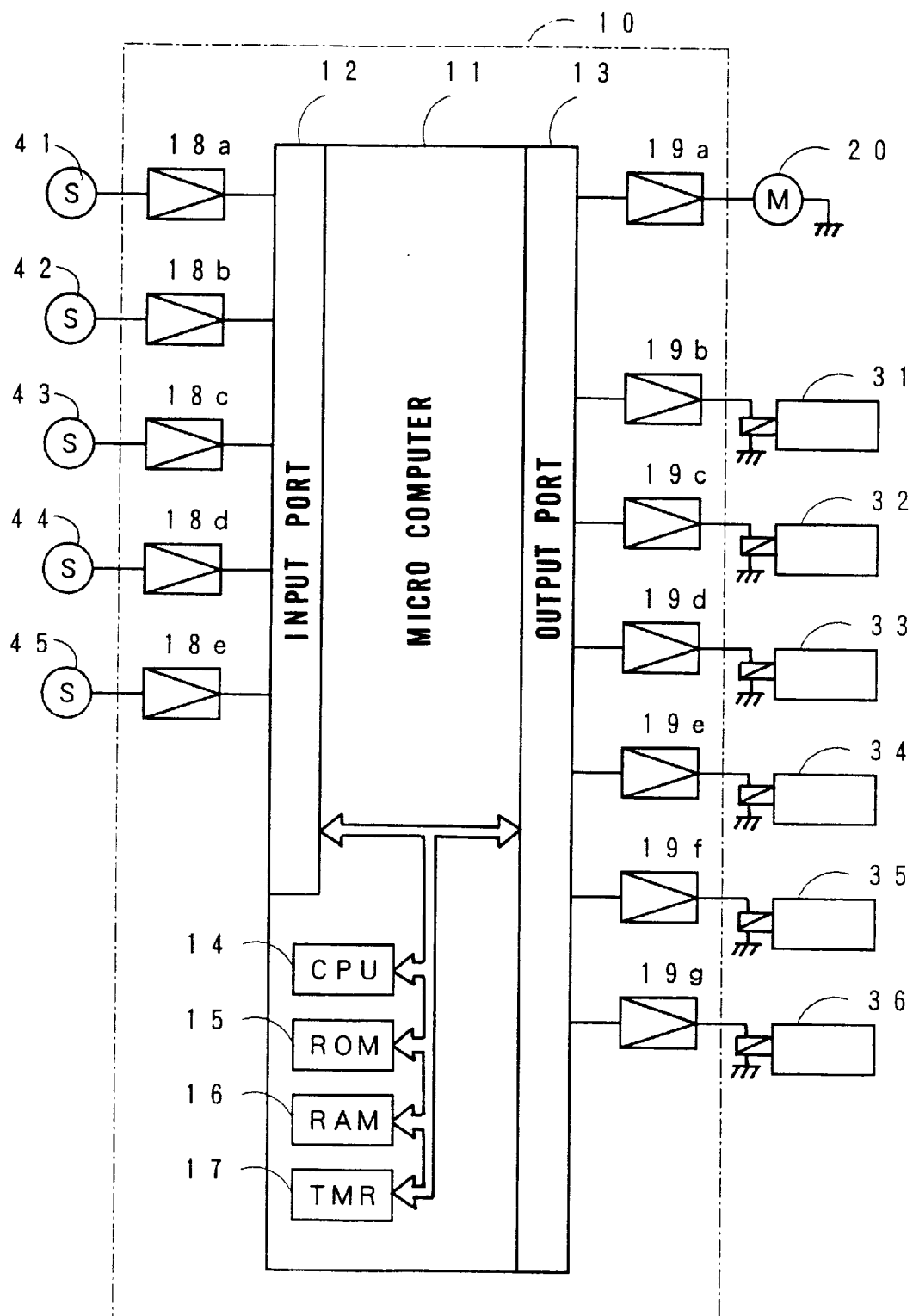
FIG. 3 is a block diagram illustrating the arrangement of an electronic controller shown in FIG. 2.

As shown in FIG. 3, the electronic controller 10 is provided with a microcomputer 11 having a central processing unit or CPU 14, a read-only memory or ROM 15, a random access memory or RAM 16, a timer 17, an input port 12 and an output port 13 via a common bus, to provide a counter for determining malfunction in one circuit which will be described later, and store a front SG flag, front LG flag, rear SG flag, rear LG flag, etc., which will be described later. The signals detected by each of the wheel speed sensors 41 to 44 and the brake switch 45 are fed to the input port 12 via respective amplification circuits 18*a* to 18*e* and then to the CPU 14. Then, a control signal is output from the output port 13 to the electric motor 20 via a drive circuit 19*a*, and control signals are fed to the solenoid valves 31 to 36 via the respective drive circuits 19*b* to 19*g*. In the microcomputer 11, the ROM 15 memorizes a program corresponding to flowcharts shown in FIGS. 4 to 7, the CPU 14 executes the program while the ignition switch (not shown) is closed, and the RAM 16 temporarily memorizes variable data necessary for executing the program.

Figure 4:
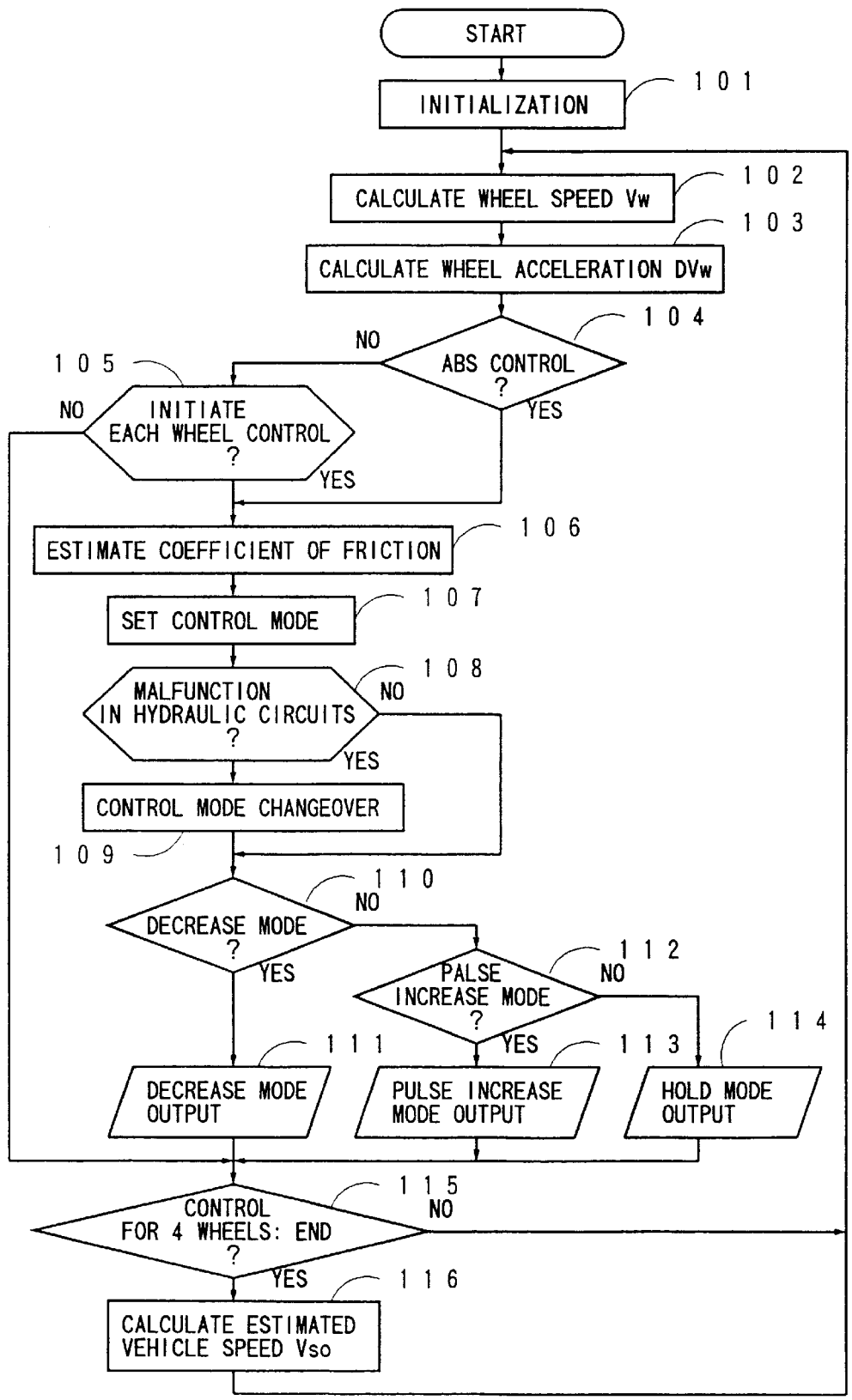
FIG. 4 is a flowchart showing the operation of the braking force control of the electronic controller according to the above embodiment of the present invention.
Figure 5:
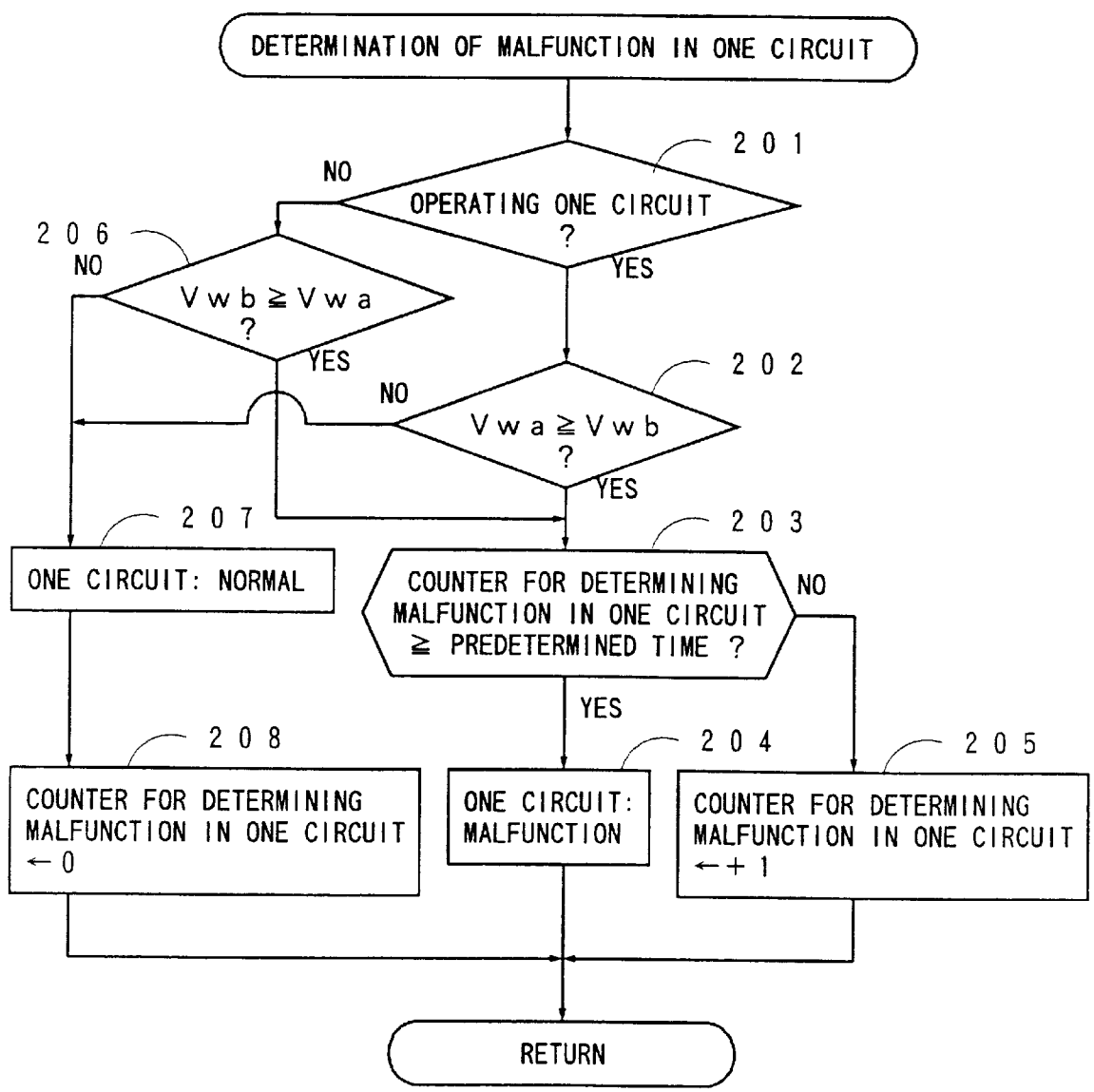
FIG. 5 is a flowchart showing the determination of malfunction in one circuit according to the above embodiment of the present invention.

In the embodiment of the present invention as constituted above, the program routine corresponding to the flowcharts as shown in FIGS. 4 and 5 starts when an ignition switch (not shown) is turned on, and provides for initialization of the system at Step 101 to clear various calculated data, an estimated vehicle speed Vso, a wheel speed Vw and wheel acceleration DVw of each wheel, etc., which will be described later. At Step 102, the wheel speed Vw is calculated in accordance with the output signal from each of the wheel speed sensors 41 to 44, and then the wheel acceleration DVw is calculated from the wheel speed Vw at Step 103. Next, at Step 104, where it is determined whether each of the road wheels is under the anti-skid control (abbreviated as ABS control as shown in FIG. 4), or not. If it is determined that the anti-skid control is operating, the program proceeds to Step 106, otherwise proceeds to Step 105, where it is determined whether the conditions for initiating the anti-skid control are fulfilled or not. If it is determined that the anti-skid control is to be started, the program proceeds to Step 106. If it is determined that the conditions have not been fulfilled, the program jumps to Step 115.

Figure 8:
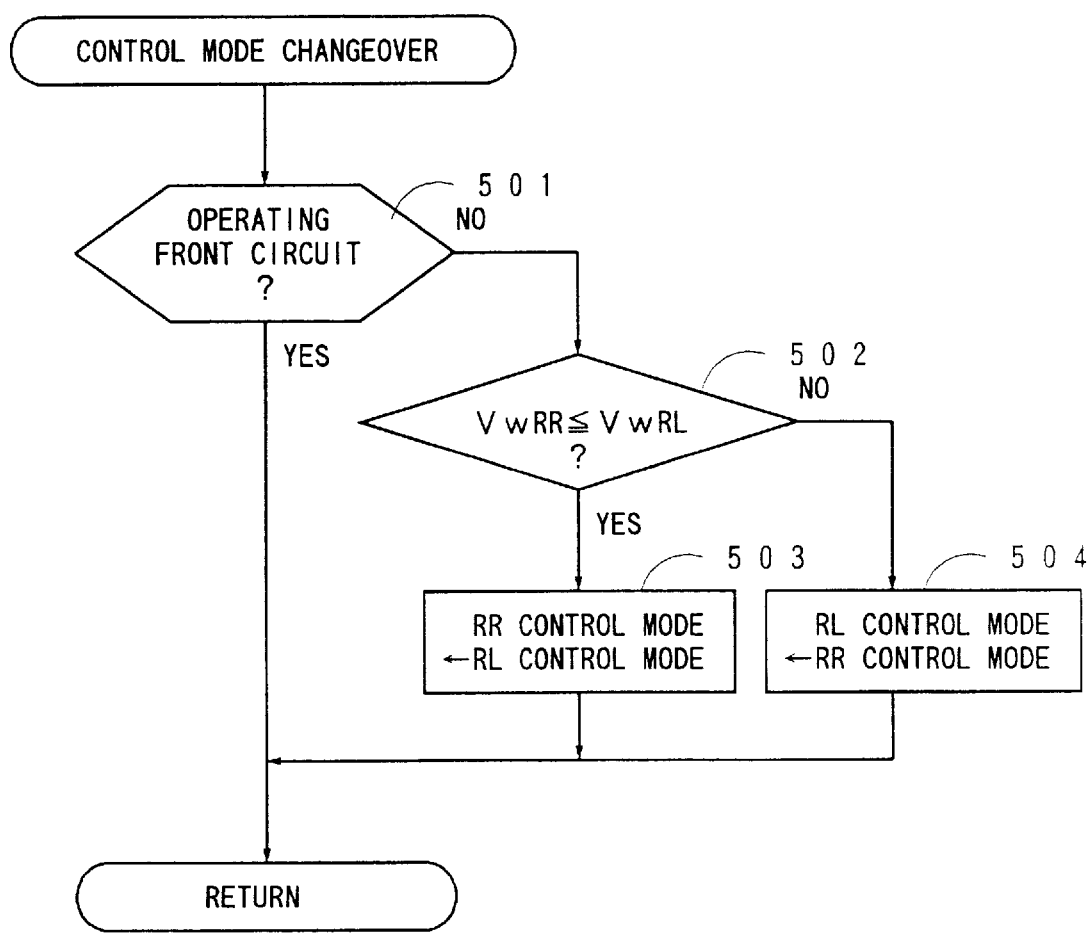
FIG. 8 is a flowchart showing the control mode changeover according to an embodiment of the present invention.

At Step 106, on the basis of a varying rate of the estimated vehicle speed Vso, for example, a coefficient of friction of a road surface is calculated to estimate a condition of the road surface. Then, the program proceeds to Step 107, where on the basis of a slip condition of a road wheel determined by the wheel speed Vw, the wheel acceleration DVw and the estimated vehicle speed Vso which will be described later, and the coefficient of friction of the road surface estimated at Step 106, one of the decrease mode, hold mode and pulse-increase mode is selected. Then, at Step 108, it is determined whether a hydraulic circuit provided for a road wheel to be controlled is in malfunction, or not. If this hydraulic circuit is normal, the program proceeds to Step 110, whereas if it is determined that the circuit is in malfunction due to some abnormal conditions, the program proceeds to Step 109 where a control mode changeover is made. That is, in order to ensure a necessary braking force by a road wheel provided in the normal hydraulic circuit, a normal anti-skid control mode is changed over to a control mode for applying the braking force in such specific pressure control operations as follows: For example, when the circuits for the front road wheels FF, FR in the front and rear dual circuit brake system are in malfunction, the control mode is changed over such that the control sensitivity to the rear road wheels RR, RL (in the rear hydraulic circuit) shall be deepened (i.e., a condition for starting the control is made relatively severe), or a pressure control based on the road wheel rotating at higher speed out of the rear road wheels RR, RL shall be performed (i.e., a rear high select control, which will be described later with reference to FIG. 8, is performed). Or, the coefficient of friction of the road surface which is estimated at Step 106 may be forced to be set to a relatively high coefficient of friction. Furthermore, it may be changed over so as to terminate the anti-skid control and perform a normal braking operation.

And, at Step 110, it is determined whether the control mode is the decrease mode, or not. If it is the decrease mode, the program proceeds to Step 111 where a decrease mode signal is output. Otherwise, the program proceeds to Step 112 where it is determined whether the control mode is the pulse-increase mode, or not. If it is determined to be the pulse-increase mode, the program proceeds to Step 113, where a pulse-increase mode signal for alternately increasing and decreasing the hydraulic braking pressure is output, thereby to increase the hydraulic braking pressure in either one of the wheel brake cylinders 51 to 54, gradually. If the control mode is not the pulse-increase mode, the program proceeds to Step 114 where a hold mode signal is output, thereby to hold the hydraulic braking pressure in the wheel brake cylinder. The above-described steps for selecting the control mode and producing the output signals of the decrease mode and pulse-increase mode signals are executed for each wheel cylinder. Then, at Step 115, it is determined whether the steps have been executed with respect to all of the four road wheels FR, FL, RR, RL, and the above-described routine is repeated until the control is executed with respect to all of the road wheels. Thereafter, the program proceeds to Step 116, where the estimated vehicle speed Vso is calculated and then returns to Step 102. The estimated vehicle speed Vso can be calculated as follows. That is, a vehicle speed in the braking operation is set to a value calculated on the assumption that the vehicle speed is reduced with a predetermined deceleration from the vehicle speed corresponding to the wheel speed in the braking operation. Then, if the wheel speed of any one of four road wheels exceeds the wheel speed corresponding to the vehicle speed as set above, the vehicle speed is reset to a value calculated on the assumption that the vehicle speed of the value previously set is reduced with the predetermined deceleration again from the vehicle speed corresponding to the exceeded wheel speed.

As an embodiment of determination of the malfunction in the hydraulic pressure circuit determined at Step 108, the determination of malfunction in one circuit will be explained hereinafter with reference to FIG. 5. The one circuit used in this embodiment designates a front hydraulic pressure circuit (hereinafter, simply referred to as a front circuit) or a rear hydraulic pressure circuit (hereinafter, simply referred to as a rear circuit) in case of the front and rear circuit system, and designates either a hydraulic pressure circuit for the road wheels FL and RR, or a hydraulic pressure circuit for the road wheels FR and RL in case of the diagonal circuit system.

Referring to FIG. 5, it is determined at Step 201 whether the operation for controlling the road wheel in the one circuit is being performed, or not. If the result is affirmative, the program proceeds to Step 202, where the wheel speed Vwa of the road wheel to be controlled (in case of the front and rear circuit system, the wheel speed VwFR of the road wheel FR at the fore right side, for example) is compared in magnitude with the wheel speed Vwb of the road wheel in the other circuit not to be controlled (in case of the front and rear circuit system, the wheel speed VWRR of the road wheel RR at the rear right side, for example). If it is determined that the wheel speed Vwa of the road wheel to be controlled is smaller than the wheel speed Vwb, the program proceeds to Step 207 where the one circuit is determined to be normal. On the contrary, if it is determined that the wheel speed Vwa of the road wheel to be controlled is equal to or greater than the wheel speed Vwb, the program proceeds to Step 203, where a time period during which this condition continues is compared with a predetermined time period. If it is determined at Step 201 that the operation for the one circuit has not been made yet, the program proceeds to Step 206, where it is determined whether the wheel speed Vwb is equal to or greater than the wheel speed Vwa. If it is determined that the wheel speed Vwb is equal to or greater than the wheel speed Vwa, the program proceeds to Step 203, where if it is determined that the wheel speed Vwb is smaller than the wheel speed Vwa, the program proceeds to Step 207.

At Step 203, in view of the fact that during a hydraulic pressure control operation for the anti-skid control, the wheel speed of the road wheel to be controlled should be smaller than the wheel speed of the road wheel not to be controlled, if the former is greater than the latter, it is deemed that the anti-skid control is not being performed with respect to the one circuit, so that if this condition continues longer than the predetermined time period, it is determined to be in malfunction. In practice, a counter for determining the malfunction in one circuit starts counting simultaneously when it is determined that the wheel speed Vwa is greater than the wheel speed Vwb at Step 202, for example. When it is determined that the counted time is greater than the predetermined time period, the program proceeds to Step 204 where it is determined that the one circuit is in malfunction. Therefore, when the counted time is less than the predetermined time period, the program proceeds to Step 205, where the counter for determining the malfunction in one circuit is counted up (+1), and then the program returns to the main routine in FIG. 4. On the other hand, when it is determined that the one circuit is normal, the program proceeds to Step 208 where the counter is cleared to be zero (0), and returns to the main routine.

Figure 6:
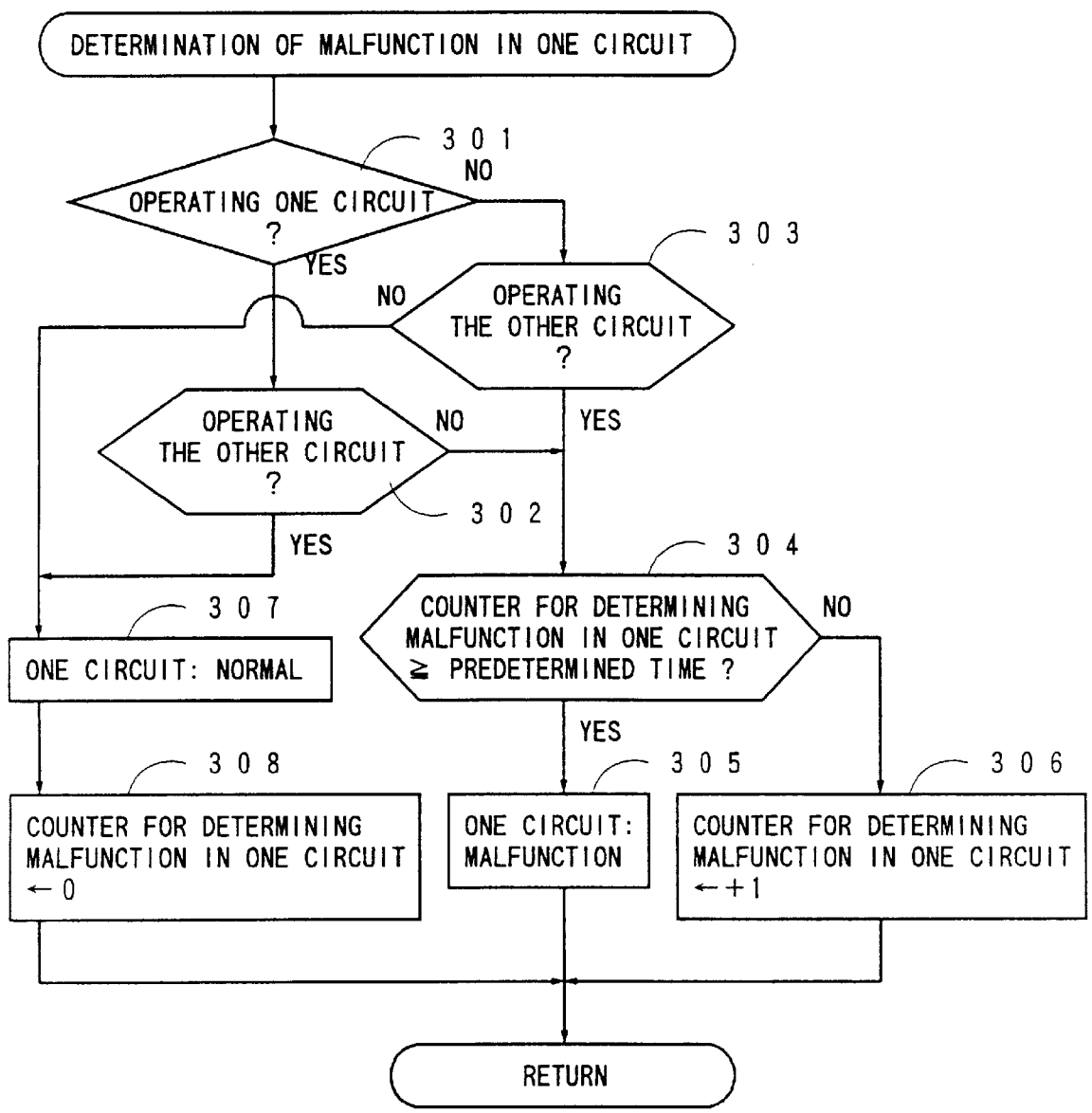
FIG. 6 is a flowchart showing the determination of malfunction in one circuit according to another embodiment of the present invention.

Another embodiment of determination of the malfunction in the hydraulic pressure circuit determined at Step 108 will be explained with reference to FIG. 6, in which it is determined at Steps 301 to 303 whether only one circuit is under the anti-skid control, or not. If the result is affirmative, the program proceeds to Step 304, where the time period during which this condition continues is compared with the predetermined time period. That is, in the case where the anti-skid control is being made with respect to only one circuit, the anti-skid control has not been performed with respect to the other circuit, so that when this condition continues longer than the predetermined time period, it is determined to be in malfunction. Accordingly, it is determined at Step 301 whether the operation is being made with respect to a road wheel to be controlled in one circuit, and also determined at Steps 302, 303 whether the operation is being made with respect to a road wheel in the other circuit.

As a result, if it is determined that the operation is made with respect to only the road wheel in one circuit, and the operation has not been made with respect to the road wheel in the other circuit, then the program proceeds to Step 304.

The counter for determining the malfunction in one circuit starts counting, simultaneously when it is determined that the anti-skid control is being performed with respect to only rear circuit, for example. When it is determined that the counted time is greater than the predetermined time period, the program proceeds to Step 305, where it is determined that the front circuit is in malfunction. Therefore, when the counted time is less than the predetermined time period, the program proceeds to Step 306 where the counter for determining the malfunction in one circuit is counted up (+1), and then the program returns to the main routine in FIG. 4. On the other hand, when the operation is made with respect to both of the hydraulic circuits, so that it is determined at Steps 301, 302 that the anti-skid control is being performed, and when it is determined at Steps 301, 303 that the anti-skid control has not been performed with respect to both of the hydraulic circuits, the program proceeds to Step 307 where it is determined that the one circuit is normal, then proceeds to Step 308 where the counter is cleared to be zero (0), and returns to the main routine.

Figure 7:
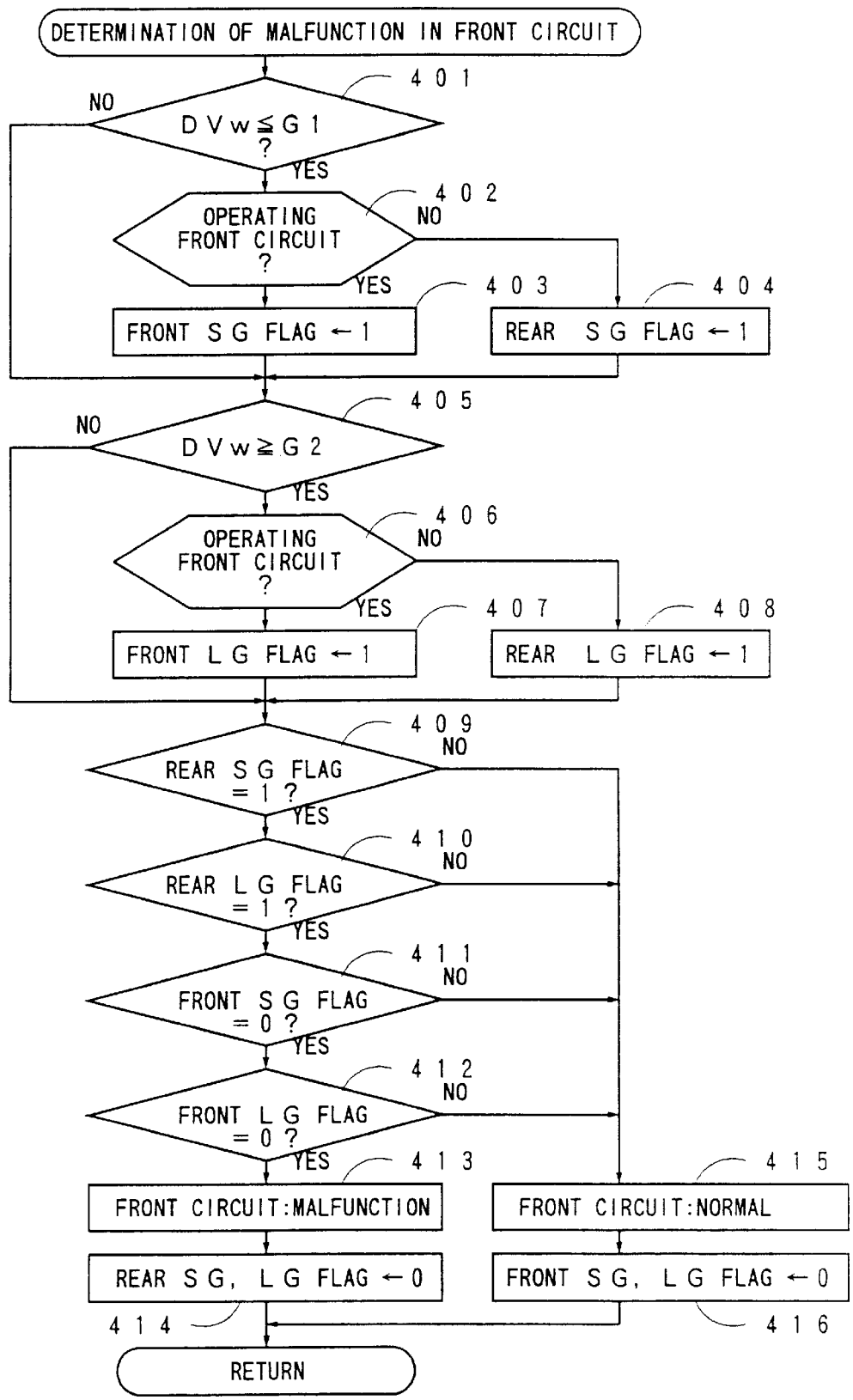
FIG. 7 is a flowchart showing the determination of malfunction in one circuit according to a further embodiment of the present invention.

In FIG. 7 a further embodiment of the determination of malfunction in one circuit is provided for determining the malfunction in a hydraulic circuit at the front wheel side in the front and rear dual circuit brake system, i.e., a front circuit, and in which the wheel acceleration DVw calculated at Step 103 in FIG. 4 may be used. At the outset, the wheel acceleration DVw is compared with a first predetermined acceleration (including deceleration of negative value) G1 (negative value in this case) at Step 401. If it is determined that the wheel acceleration DVw is equal to or smaller than the first predetermined acceleration G1 (<0), the program proceeds to Step 402, while if it exceeds the first predetermined acceleration G1, the program proceeds to Step 405. At Step 402, it is determined whether the front circuit is to be operated, or not. If the result is affirmative, the program proceeds to Step 403 where the front SG flag is set (1) to indicate that the acceleration in the front circuit has become smaller than the first predetermined acceleration G1 (<0). On the other hand, in the case where the front circuit is not the one to be operated, the rear SG flag is set (1) to indicate that the acceleration in the rear circuit has become smaller than the first predetermined acceleration G1.

Next, at Step 405, the wheel acceleration DVw is compared with a second predetermined acceleration G2 (positive value in this case). If it is determined that the acceleration is equal to or greater than the second predetermined acceleration G2 (>0), the program proceeds to Step 406, while if it is determined that the acceleration is less than the second predetermined acceleration G2, the program proceeds to Step 409. At Step 406, it is determined whether the front circuit is to be operated, and if so, the program proceeds to Step 407, where the front LG flag is set to indicate that the acceleration in the front circuit becomes greater than the second predetermined acceleration G2 (>0). Whereas, in the case where the front circuit is not to be operated, the program proceeds to Step 408 where the rear LG flag is set to indicate that the acceleration in the rear circuit becomes greater than the second predetermined acceleration G2.

And then, it is determined at Steps 409 to 412 whether the front circuit is in malfunction or not, in accordance with the conditions of the above-described flags. That is, if the rear SG flag is set to indicate that the acceleration in the rear circuit becomes smaller than the first predetermined acceleration G1 (<0) and the rear LG flag is set to indicate that the acceleration in the rear circuit becomes greater than the second predetermined acceleration G2 (>0), while the front SG flag, which indicates that the acceleration in the front circuit becomes smaller than the first predetermined acceleration G1 (<0), is reset, and the front LG flag, which indicates that the acceleration in the front circuit becomes greater than the second predetermined acceleration G2 (>0), then it is determined at Step 413 that the front circuit is in malfunction. Thereafter, the program proceeds to Step 414 where the set rear SG flag and rear LG flag are reset to be zero (0), and returns to the main routine in FIG. 4. On the contrary, when the rear SG flag or rear LG flag is reset (0), or when the front SG flag or front LG flag is set (1), the program proceeds to Step 415, where it is determined that the front circuit is normal. Then, after the set front SG flag and front LG flag were reset (0), the program returns to the main routine. According to the present embodiment, therefore, an adequate determination of abnormality can be made on the basis of the wheel acceleration, and the malfunction in the front circuit can be detected certainly.

The control mode changeover executed at Step 109 in FIG. 4 will be explained with reference to FIG. 8, which discloses an embodiment in which the control mode changeover is made as so to perform a rear high select control when the front circuit is in malfunction. That is, it is determined at Step 501 whether the operation in the front circuit is being made, or not. If the result is affirmative, the program returns to the main routine in FIG. 4, while if the operation in the rear circuit is being made, the program proceeds to Step 502, where the wheel speeds VwRR and VwRL of the rear road wheels RR, RL are compared with each other. If the wheel speed VwRR is lower than the wheel speed VwRL, the program proceeds to Step 503, where a control mode to the rear road wheel RL at the higher speed side is substituted for a control mode to the rear road wheel RR at the lower speed side. If the wheel speed VwRR is the higher one, the program proceeds to Step 504, where the control mode of the rear road wheel RR at the higher speed side is substituted for the control mode of the rear road wheel RL at the lower speed side. As a result, the control modes of the rear road wheels RR, RL are set to be the one at the higher speed side.

As described above, according to each embodiment, the malfunction in any hydraulic circuits can be detected certainly. When the malfunction is found, an appropriate changeover of control mode will be precisely made to ensure a sufficient braking force. Although the above-described embodiment relates to a brake system of simultaneous rear wheels control as shown in FIG. 2, it is applicable to a brake system of independent rear wheels control.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A hydraulic braking pressure control system for an automotive vehicle having a dual circuit brake system comprising:

a hydraulic pressure generator for generating a hydraulic braking pressure;

wheel brake cylinders operatively connected to road wheels of said vehicle for applying a braking force thereto, respectively, said wheel brake cylinders being divided into a first group of wheel brake cylinders and a second group of wheel brake cylinders;

two hydraulic pressure circuits connecting said hydraulic pressure generator with said first group and second group of wheel brake cylinders, respectively;

pressure control means disposed in said two hydraulic pressure circuits, between said hydraulic pressure generator and said wheel brake cylinders, for controlling the hydraulic braking pressure in each of said wheel brake cylinders;

wheel speed detection means for detecting wheel speeds of said road wheels, respectively;

braking force control means for controlling the braking force by actuating said pressure control means in accordance with control modes provided in response to output signals of said wheel speed detection means;

wheel speed comparison means for comparing a wheel speed of a road wheel operatively connected to one of said wheel brake cylinders disposed in one of said two hydraulic pressure circuits in which the hydraulic braking pressure is controlled by said pressure control means with a wheel speed of a road wheel operatively connected to one of said wheel brake cylinders disposed in the other hydraulic pressure circuit in which the hydraulic braking pressure is not controlled by said pressure control means on the basis of the output signals of said wheel speed detection means;

circuit malfunction detection means for detecting a malfunction caused in said hydraulic pressure circuit including said wheel brake cylinder in which the hydraulic braking pressure is controlled by said pressure control means when the wheel speed of said road wheel operatively connected to said wheel brake cylinder in which the hydraulic braking pressure is controlled by said pressure control means is larger than that of said road wheel operatively connected to said wheel brake cylinder in which the hydraulic braking pressure is not controlled by said pressure control means; and control mode changeover means provided in said braking force control means for changing over a control mode to another control mode when said circuit malfunction detection means detects a malfunction.

2. A hydraulic braking pressure control system as set forth in claim 1, wherein said wheel speed comparison means includes a first counter for counting a first time period during which a wheel speed of a road wheel to be controlled in one of said two hydraulic pressure circuits is greater than a wheel speed of a road wheel not to be controlled in the other hydraulic pressure circuit, and said wheel speed comparison means is adapted to determine whether said first time period exceeds a predetermined time period, and wherein said circuit malfunction detection means is adapted to determine that the malfunction occurs in said one hydraulic pressure circuit when said wheel speed comparison means determines that said first time period exceeds the predetermined time period.

3. A hydraulic braking pressure control system as set forth in claim 1, wherein said control mode changeover means is adapted to change over a normal anti-skid control mode to a severe anti-skid control mode with a starting condition thereof relatively hard to be initiated, when said circuit malfunction detection means detects the malfunction.

* * * * *